April 16, 1968     R. J. CHLOPAN     3,377,710

BEARING FREE-PLAY INDICATOR

Filed Jan. 5, 1966     3 Sheets-Sheet 2

ROBERT J. CHLOPAN
INVENTOR

BY John R. Faulkner
Donald J. Harrington
ATTORNEYS

ROBERT J. CHLOPAN
INVENTOR

United States Patent Office 3,377,710
Patented Apr. 16, 1968

3,377,710
BEARING FREE-PLAY INDICATOR
Robert J. Chlopan, Detroit, Mich., assignor to Ford
Motor Company, Dearborn, Mich., a corporation
of Delaware
Filed Jan. 5, 1966, Ser. No. 518,935
2 Claims. (Cl. 33—174)

ABSTRACT OF THE DISCLOSURE

This specification describes a rotary bearing structure. It includes a means for measuring the free-play of a bearing assembly having a pair of spaced bearing elements.

General description of the invention

The invention is adapted particularly for use with wheel bearing assemblies for vehicle wheels wherein the hub of the wheel is mounted upon a spindle assembly by means of spaced, tapered roller bearings. In such arrangements, provision must be made to maintain proper minimum dimensional tolerance of the bearings after assembly so that the bearings will not be subjected to excessive loads. Excessive axial free-play should be avoided since this will provide undesirable relative shifting movement of the wheel hub with respect to the relatively stationary spindle assembly. The wheel hub is provided with a sleeve shaft that is received within a bearing opening in the spindle assembly. The sleeve shaft, in turn, is splined to the axle shaft.

The provision of a bearing play indicator of the type above set forth is a principal object of my invention; it is a further object of my invention to provide a bearing free-play indicator that can be applied to an assembled wheel bearing for a vehicle wheel without the necessity for using special mounting fixtures or other checking apparatus. Direct readings of the dimensional tolerance of the assembled wheel bearing thus can be obtained.

It is a further object of my invention to provide an axial free-play indicator for vehicle wheel bearings which can be applied and removed during usage without the necessity for using special tools.

Particular description of the invention

Figure 3:
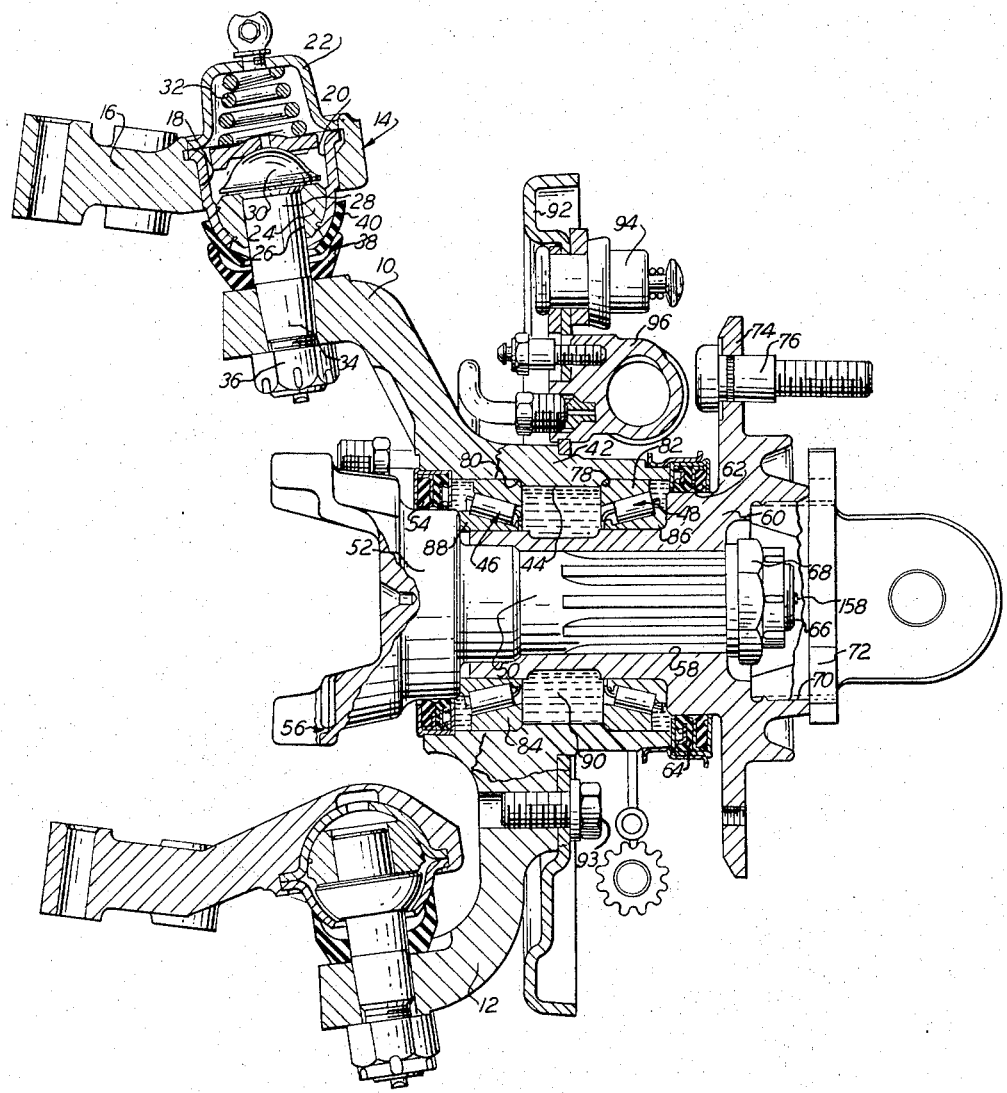
FIGURE 3 is a cross-sectional view of a wheel spindle assembly for a dirigible wheel of a wheeled vehicle.

In FIGURE 3, numerals 10 and 12 designate wheel support arms. Arm 10, like arm 12, is joined to a socket assembly 14 which comprises a base member 16 adapted to be secured to a control arm for a front wheel suspension for an automotive vehicle. Formed in the member 16 is an opening 18 which receives a socket element 20 and a spring retainer element 22. A crowned member 24, which is formed with a central opening, is situated in the socket element 20. Received within the opening 26 is a threaded pin 28 having a head 30 which is urged into engagement with the socket member 24 by spring 32, the latter being anchored against the spring retainer element 22.

Pin 28 is formed with a tapered section 34 received within a cooperating tapered opening in the arm 10. The pin 28 is held fast by a retainer nut 36.

A rubber boot 38, which surrounds pin 28, engages both arm 10 and a crowned seal washer 40 which is engageable with the socket element 20.

A spindle hub in the form of sleeve 42 is connected to the arms 10 and 12. Hub 42 is provided with a central opening 44 for receiving bearings 46 and 48. An axle shaft 50 is received through the central opening 44 and is journaled for rotation about its axis by bearings 46 and 48. Shaft 50 is provided with a seal shoulder 52 about which is positioned a fluid seal 54. The inboard end of axle shaft 50 is formed with a universal joint yoke 56.

Shaft 50 is externally splined to facilitate a driving connection with an internally splined opening 58 of a wheel hub 60. Hub 60 is formed with a seal shoulder 62 about which is positioned a fluid seal 64.

The end 66 of the axle shaft 50 is threaded to receive a nut 68 which has a shoulder that is engageable with the end of hub 60.

Hub 60 is threaded at 70 to receive an externally threaded closure element in the form of a nut 72.

A flange 74 formed on the hub 60 facilitates a driving connection with a wheel drum. A driving connection between the flange 74 and the wheel drum is provided by a series of threaded studs 76.

The hub 42 is formed with a pair of internal shoulders 78 and 80. These shoulders engage respectively outer races 82 and 84 of wheel bearings 48 and 46. The inner races 86 and 88 of the bearings 48 and 46 respectively engage the shoulders for the adjacent seals. Thus, race 86 engages shoulder 62 and race 88 engages shoulder 52. The annular space between the seals 54 and 64 retains bearing lubricant 90.

As the nut 68 is tightened, the shoulder 62 applies a load to the bearings 46 and 48 and the reaction produced by the force applied by shoulder 62 is taken by shoulder 78. In a similar fashion the clamping force of the nut 68 causes engagement of the shoulder 52 with the race 88. The force reaction is taken by the outer race of the bearing 46 as it engages shoulder 80.

A brake plate 92 is secured to the hub 42 by bolts 93. This plate carries a wheel brake reaction pin 94 and a wheel brake cylinder 96 for the wheel brake servos.

Figure 1:
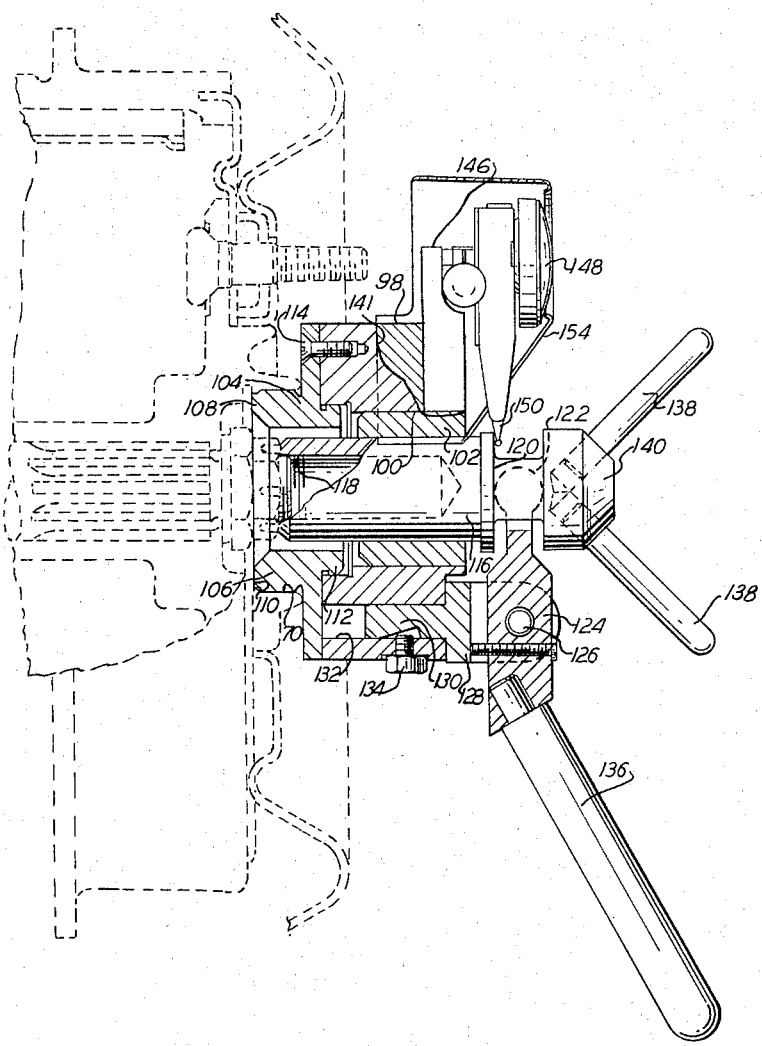
FIGURE 1 shows a longitudinal cross-sectional view of my improved indicator assembly.
Figure 2:
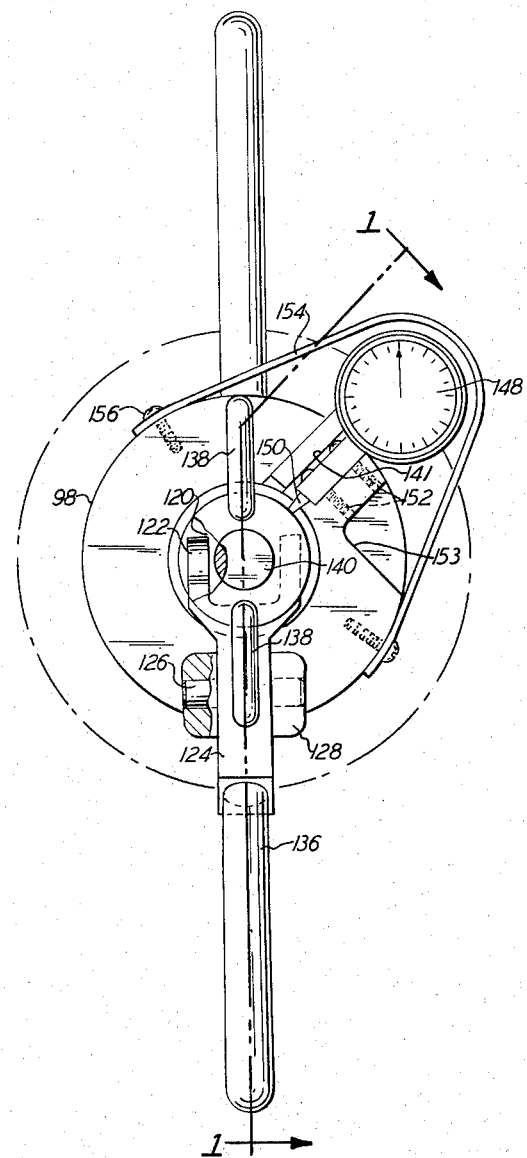
FIGURE 2 is an end view of the structure of FIGURE 1.

In FIGURE 1 I have illustrated my improved bearing tolerance indicator assembled on the end of the axle shaft 50. It includes a body 98 having a central bearing opening 100. Located in the opening 100 is a bushing 102. Secured to the inward side of the body 98 is an end ring 104 having an externally threaded portion 106. This threaded portion is adapted to be received within the threaded opening 70 of the hub 60. The end 108 of the end ring 104 engages a shoulder 110 formed in the end of the hub 60.

The ring 104 has a central hub 112 which is received within an enlarged diameter part of the opening 100. The body 98 may be formed of aluminum while the ring 104 may be formed of steel. The two parts are held together by screws 114.

Slidably positioned within bushing 102 is a pin 116. This pin is formed with a central opening which is threaded at its end 118 to establish a threaded connection with the threaded end 66 of the axle shaft 50.

The pin 116 extends outwardly from the body 98 and is formed with an annular groove 120 which receives a forked end 122 of a control level 124. This lever is pivoted by means of a pin 126 on a yoke 128 which has a shank 130. This shank is received within an opening 132 formed in the body 98. It is held fast by a set screw 134.

Lever 124 includes a handle 136 which may be gripped by the operator.

A pair of finger grips 138 extend from the outermost end 140 of the pin 116. By gripping the grips 138 and rotating the pin 116 after the ring 104 is threaded in place, the operator can establish a threaded connection between the pin 116 and the axle shaft 50.

The body 98 is formed with a slot 141 which receives the block 146 of a gage 148. The gage includes a trigger 150 which is received within the annular groove 120. It is adapted to be displaced in the direction of the axis of the pin 116 when the pin 116 is shifted upon movement of the lever 124 by the operator. The block 146 can be held in place by one or more screws 152. These are threadably received in body 98, the latter being cut away at 153 to permit entry of the screws. A housing 154 extends over the gage 148 and it is anchored by screws 156 to the body 98.

The indicator shown in FIGURE 1 can be assembled readily without the need for special tools and without removing the wheel. When the spindle is assembled in place the indicator will permit the operator to shift the pin in the direction of the axis of the axle shaft. He may do this by properly oscillating the lever 124 about its axis 126. The amount of the displacement that is obtained is registered by the dial indicator or strain gage. This measurement is an indication of the free-play in the axial dimensions between the shoulders 52 and 62. If there is zero free-play, excessive loading of the tapered bearing elements of the bearings 46 and 48 will occur. This condition can be avoided by varying the indicated free-play. At the same time excessive free-play can be avoided. When the desired free-play is within the desired tolerance, a cotter pin 158 is put in place in a cotter key slot formed in the shaft end 66. The nut 68 is castellated to accommodate the cotter key 158.

Having thus described a preferred form of my invention, what I claim and desire to secure by U.S. Letters Patent is:

1. In a gaging apparatus for measuring the axial play in a wheel bearing assembly which bearing assembly comprises a spindle hub, a pair of spaced bearings in said hub each bearing having an inner race and an outer race, the outer race of each bearing being anchored within said hub, a wheel hub received within said spindle hub and rotatably supported therein by said bearings, an axle shaft extending through said wheel hub, a shoulder formed on said axle shaft and engageable with the inner race of one bearing, a reaction shoulder formed on said wheel hub in engagement with the inner race of the other bearing, said gaging apparatus comprising an indicator body, a central opening in said body, a pin slidably positioned in said opening, means for releasably connecting said body to said wheel hub, means for releasably connecting said pin to said axle shaft, manually operable lever means including a lever element pivoted on said body, one end of said lever element being engageable with said pin and adapted to move said pin axially in said opening upon oscillating movement of the lever means, and means for recording the displacement of said pin with respect to said body thereby providing a visual indication of the degree of tolerance between said inner bearing races, said pin being adapted to be threadably connected to said axle shaft and rotated relative to said body to establish and disestablish a connection therebetween, said pin having an annular groove situated at a location adjacent externally of said body, said lever means having a handle extending outwardly and radially, inwardly disposed finger received within said groove whereby said pin is shifted in the direction of the axis of said shaft as said handle is moved about an axis transverse to the axis of said shaft.

2. In a gaging apparatus for measuring the axial play in a wheel bearing assembly, which bearing assembly comprises a spindle hub, a pair of spaced bearings in said hub each bearing having an inner race and an outer race, the outer race of each bearing being anchored within said hub, a wheel hub received within said spindle hub and rotatably supported therein by said bearings, an axle shaft extending through said wheel hub, a shoulder formed on said axle shaft and engageable with the inner race of one bearing, a reaction shoulder formed on said wheel hub in engagement with the inner race of the other bearing, said gaging apparatus comprising an indicator body, a central opening in said body, a pin slidably positioned in said opening, means for releasably connecting said body to said wheel hub, means for releasably connecting said pin to said axle shaft, manually operable lever means including a lever element pivoted on said body, one end of said lever element being engageable with said pin and adapted to move said pin axially in said opening upon oscillating movement of the lever means, and means for recording the displacement of said pin with respect to said body thereby providing a visual indication of the degree of tolerance between said inner bearing races, said pin being adapted to be threadably connected to said axle shaft and rotated relative to said body to establish and disestablish a connection therebetween, and bearing means in said opening for accommodating axial sliding movement and rotary movement of said pin, said pin having an annular groove situated at a location externally of said body, said lever means having a handle extending outwardly and a radially inwardly disposed finger element received within said groove whereby said pin is shifted in the direction of the axis of said shaft as said handle is moved about an axis transverse to the axis of said shaft.

References Cited

UNITED STATES PATENTS

| | | | |
|---|---|---|---|
| 2,145,841 | 1/1939 | Walters | 33—181 |
| 2,170,493 | 8/1939 | Clapper | 33—172 |

SAMUEL S. MATTHEWS, *Primary Examiner.*